(12) United States Patent
Timings

(10) Patent No.: US 6,505,729 B2
(45) Date of Patent: Jan. 14, 2003

(54) METHOD AND APPARATUS FOR REDUCING MISALIGNMENT OF ARTICLES ON A CONVEYOR

(75) Inventor: Bernard Austin Timings, Rugby (GB)

(73) Assignee: Ishida Co., Ltd., Kyoto (JP)

( * ) Notice: Subject to any disclaimer, the term of this patent is extended or adjusted under 35 U.S.C. 154(b) by 22 days.

(21) Appl. No.: 09/922,769

(22) Filed: Aug. 7, 2001

(65) Prior Publication Data

US 2002/0033317 A1 Mar. 21, 2002

(30) Foreign Application Priority Data

Aug. 8, 2000 (GB) .............................................. 0019510

(51) Int. Cl.7 .............................................. B65G 47/24
(52) U.S. Cl. ........................................ 198/411; 198/396
(58) Field of Search ................................ 198/396, 598, 198/411, 416, 382, 394

(56) References Cited

U.S. PATENT DOCUMENTS

| | | | | |
|---|---|---|---|---|
| 3,306,425 A | * | 2/1967 | Rapp, Jr. et al. | ........... 198/399 |
| 3,332,531 A | * | 7/1967 | Chaney | ...................... 198/416 |
| 4,225,031 A | * | 9/1980 | Frisbie et al. | ........... 198/399 X |
| 4,967,899 A | | 11/1990 | Newsome | |
| 5,299,675 A | * | 4/1994 | Schumann et al. | ..... 198/416 X |

FOREIGN PATENT DOCUMENTS

| | | | | |
|---|---|---|---|---|
| EP | 0 341 811 A1 | 11/1989 | ........... | B65G/47/22 |
| GB | 1199014 | 7/1970 | ........... | B65G/27/02 |
| GB | 2 329 884 A | 4/1999 | ......... | B65G/47/244 |
| JP | 5-246529 | 9/1993 | ........... | B65G/47/14 |
| NL | 9300313 | 9/1994 | ......... | B65G/47/244 |
| WO | WO 92/1838 | 10/1992 | ........... | B65B/35/58 |

* cited by examiner

Primary Examiner—James R. Bidwell
(74) Attorney, Agent, or Firm—Staas & Halsey LLP

(57) ABSTRACT

A method and apparatus for reducing misalignment of articles, such as lightweight packets of snack food, conveyed on a conveyor. A conveyor conveys articles in a conveying direction along a predetermined conveying path. The conveyed articles have a desired direction of alignment relative to the conveying direction and are conveyed so that a misaligned article tends to project laterally from the conveying path. An aligning device includes at least one projection traveling cyclically adjacent to the conveying path so as to contact a conveyed, misaligned article and thereby rotate the conveyed, misaligned article to reduce misalignment.

23 Claims, 1 Drawing Sheet

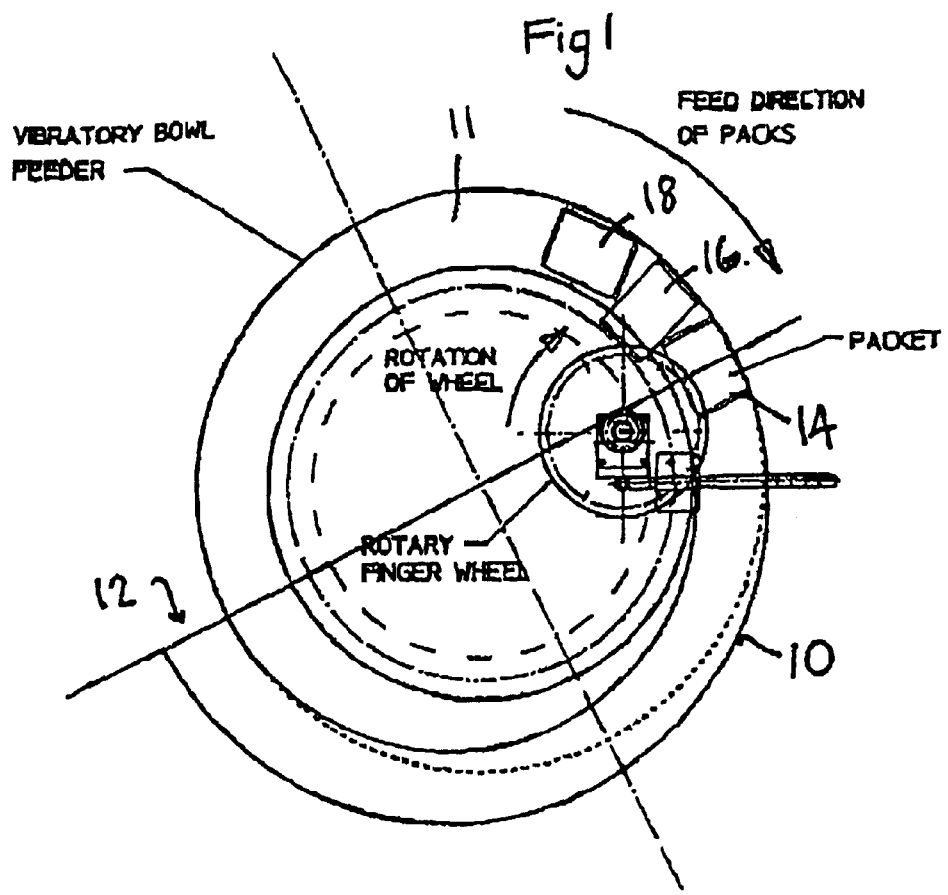
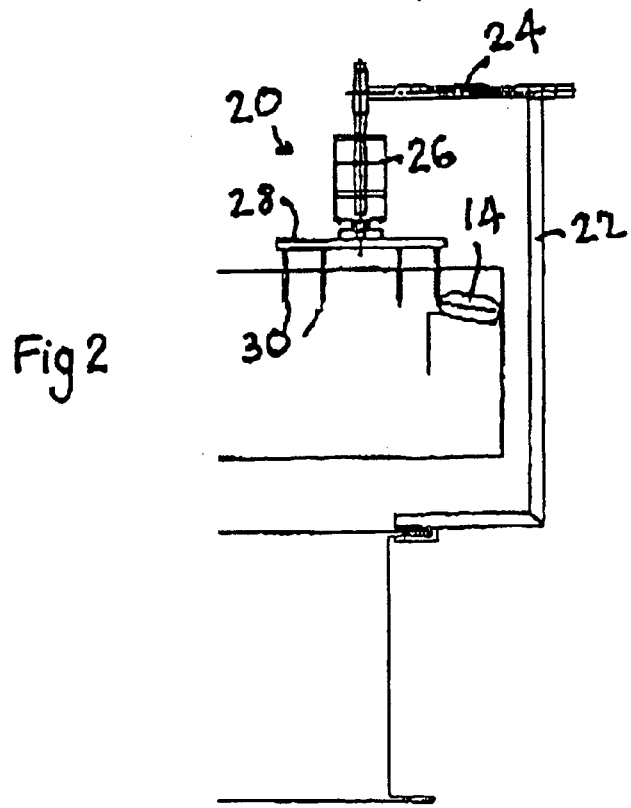

METHOD AND APPARATUS FOR REDUCING MISALIGNMENT OF ARTICLES ON A CONVEYOR

CROSS-REFERENCE TO RELATED APPLICATION

This application claims priority to United Kingdom patent application 0019510.7, filed Aug. 8, 2000, and which is incorporated herein by reference.

BACKGROUND OF THE INVENTION

1. Field of the Invention

The present invention relates to a method and apparatus for reducing misalignment of articles conveyed by a conveyor.

2. Description of the Related Art

Conveyors are typically used to move articles, such as, for example, packets of snack foods, in manufacturing and/or packaging processes. Such conveyors typically run at high speed.

Unfortunately, articles can become misaligned on the conveyor, thereby causing problems in the manufacturing and/or packaging processes.

SUMMARY OF THE INVENTION

Accordingly, it is an object of the present invention to provide an economical and effective system for improving the degree of alignment of conveyed articles.

Additional objects and advantages of the invention will be set forth in part in the description which follows, and, in part, will be obvious from the description, or may be learned by practice of the invention.

Objects of the present invention are achieved by providing an apparatus including a conveyor and an aligning device. The conveyor conveys articles in a conveying direction along a predetermined conveying path, the conveyed articles having a desired direction of alignment relative to the conveying direction and being conveyed so that a misaligned article tends to project laterally from the conveying path. The aligning device includes at least one projection traveling cyclically adjacent to the conveying path so as to contact a conveyed, misaligned article and thereby rotate the conveyed, misaligned article to reduce misalignment.

Objects of the present invention are also achieved by providing an apparatus comprising a conveyor and a projection. The conveyor conveys articles in a conveying direction along a predetermined conveying path, the conveyed articles having a desired direction of alignment relative to the conveying direction and being conveyed so that a misaligned article tends to project laterally from the conveying path. The projection travels cyclically adjacent to the conveying path so as to contact a conveyed, misaligned article and thereby rotate the conveyed, misaligned article to reduce misalignment.

Moreover, objects of the present invention are achieved by providing an apparatus including a conveyor and a rotary element. The conveyor conveys articles in a conveying direction along a predetermined conveying path, the conveyed articles having a desired direction of alignment relative to the conveying direction and being conveyed so that a misaligned article tends to project laterally from the conveying path. The rotary element has a projection projecting therefrom. The rotary element rotates and is positioned so that the projection travels cyclically adjacent to the conveying path so as to contact a conveyed, misaligned article and thereby rotate the conveyed, misaligned article to reduce misalignment.

Objects of the present invention are further achieved by providing a method including (a) conveying articles in a conveying direction along a predetermined conveying path, the conveyed articles having a desired direction of alignment relative to the conveying direction and being conveyed so that a misaligned article tends to project laterally from the conveying path; and (b) causing an element to travel cyclically adjacent to the conveying path so as to contact a conveyed, misaligned article and thereby rotate the conveyed, misaligned article to reduce misalignment.

In addition, objects of the present invention are achieved by providing an apparatus which aligns articles conveyed in a conveying direction along a predetermined conveying path, the conveyed articles having a desired direction of alignment relative to the conveying direction and being conveyed so that a misaligned article tends to project laterally from the conveying path. The apparatus includes an element traveling cyclically adjacent to the conveying path so as to contact a conveyed, misaligned article and thereby rotate the conveyed, misaligned article to reduce misalignment. The element could be, for example, some type of projection. However, the present invention is not limited to the element being a projection, and other types of elements which perform the intended operation will suffice.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

FIG. 1 is a diagram illustrating a top plan view of a vibratory bowl conveyor assembly including an aligning device, according to an embodiment of the present invention.

FIG. 2 is a diagram illustrating a side elevation of part of the assembly shown in FIG. 1, according to an embodiment of the present invention.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

FIG. 1 is a diagram illustrating a top plan view of a vibratory bowl conveyor assembly including an aligning device, according to an embodiment of the present invention. FIG. 2 is a diagram illustrating a side elevation of part of the assembly shown in FIG. 1, according to an embodiment of the present invention.

Referring now to FIGS. 1 and 2, a bowl conveyor 10 is a large generally cylindrical bowl having a spiral track 11 extending from its base, around the inside of the cylindrical wall, to an outlet region 12. The bowl conveyor 10 is mounted on a stand and arranged to be driven by a motor with a vibratory motion such that articles placed in the bowl conveyor 10 are induced to travel up the spiral path defined by track 11, and out of the outlet region 12.

FIG. 1 shows three articles 14, 16, 18. Articles 14, 16 and 18 are, for example, rectangular in plan and may be, for example, packets of snack food, such as bags of crisps. Generally, the present invention is especially applicable to lightweight articles which are generally rectangular in plan, such as packets of snack foods. However, the present invention is not limited to these types of articles, and the present invention can be applied, for example, to larger, heavier articles which are not necessarily rectangular in shape.

In this example, the path defined by the track 11 has a width which is slightly greater than the width of the articles. Therefore, properly aligned articles such as the first and last articles 14 and 18, respectively, shown in FIG. 1 travel along the path, fully on it. However, a misaligned article, such as the central article 16, projects laterally off the path.

An aligning device 20 is provided at one region of the bowl conveyor 10. Aligning device 20 is mounted by a stand 22 and an arm 24. The arm 24 supports a motor 26 with a substantially vertical axis. At the bottom end, the motor 26 is rotationally fast with, for example, a circular disc 28 whose lower face has an annular array of equally spaced projections 30 (six in this example). Of course, this is only one example of a aligning device, and the present invention is not limited to this specific example. For example, different motors and support structures can be used. Moreover, the present invention is not limited to any specific number of projections being used. Also, various shaped elements, other than a circular disc, can be used to perform the required operation.

The projections 30 are, for example, elongate and resilient. In this example, projections 30 might be, for example, spring elements such as those used for door stops. Of course, the present invention is not limited to projections 30 being this specific type. Instead, many other types of projections, of many different shapes, many different sizes and different levels of resiliency, and many different materials can be used. Thus, the present invention is not limited to the specific types of projections show in FIG. 2.

The aligning device 20 is mounted so that the path of the projections 30, when the disc 28 rotates, carries them adjacent the track 11. As can be seen in FIG. 2, a correctly aligned article (i.e., a packet) 14 is not contacted by a projection 30. However a misaligned article, such as the article 16, projects into the path of the projections 30. The rate of rotation of the motor is such that the disc 28 conveys the projections 30 at a higher speed than the articles 14, 16, 18 are conveyed along the conveyor. Therefore, as the misaligned article 16 passes the aligning device 20, the article 16 will be contacted by at least one of the projections 30, which will tend to rotate the article 16, to improve its alignment.

The motor 26 and disc 28 may, for example, be tilted slightly so that the projections 30 rise slightly as they pass adjacent the conveying path.

Therefore, according to embodiments of the present invention, an alignment system includes a conveyor conveying articles along a predetermined path. The articles have a desired direction of alignment relative to the conveying direction, and the arrangement being such that a misaligned article tends to project laterally of the conveying path. An aligning device has a projection and a mechanism for displacing the projection cyclically so that it travels adjacent the conveying path so as to be capable of contacting a misaligned article and thereby rotating it to reduce misalignment.

The mechanism for displacing the projection may be, for example, a rotary element from which the projection projects. Thus, the mechanism may employ a rotatable wheel (or annulus) having projections projecting parallel to the axis of rotation. The rotary element is mounted, for example, adjacent the conveying path so that its rotation causes the projections to sweep round and pass adjacent the conveying path, so that the projections travel in the conveying direction somewhat faster than the conveying speed. The rotary disk or annulus may be, for example, horizontal or may be tilted slightly upwardly in the conveying direction.

As an example, another form of rotary element could have an axis of rotation extending generally transversely to the conveying path, with radially extending projections. Alternatively, the rotary element could be, for example, a relatively short endless belt with projections, a run of the belt extending adjacent the conveying path.

The projections desirably have some flexibility, to reduce the risk of damaging the articles and/or to reduce the risk of injury to personnel. Thus, as previously indicated, the projections might, for example, be resilient elements, e.g. involving coil springs or elongate resilient bodies, e.g. of rubber. Alternatively, for example, the projections might be relatively flexible, e.g. strips of flexible plastic material such as those used for drive-through doors.

The conveyor may be, for example, a vibratory bowl conveyor or a linear conveyor, e.g. a belt or chain conveyor. However, the present invention is not limited to any specific type of conveyor. There may be a barrier at one side of the conveying path, so that misaligned articles project to the other side, where the aligning device is provided. Moreover, there may be a plurality of aligning devices. For example, if there are two such aligning devices and each of them has an 80% success rate in correcting alignment, 96% of misaligned articles will be corrected.

In various embodiments of the present invention, with an aligning device, at least one projection is displaced, for example, parallel to the conveying direction at somewhat faster speed than the conveying speed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. Apparatus comprising:
    a conveyor conveying articles in a conveying direction along a predetermined conveying path, the conveyed articles having a desired direction of alignment relative to the conveying direction and being conveyed so that a misaligned article tends to project laterally from the conveying path; and
    an aligning device including at least one projection traveling cyclically adjacent to the conveying path so as to contact a conveyed, misaligned article and thereby rotate the conveyed, misaligned article to reduce misalignment.

2. An apparatus according to claim 1, wherein the aligning device includes a rotary element from which said at least one projection projects.

3. An apparatus according to claim 2, wherein the rotary element is a rotatable wheel or annulus from which said at least one projection projects parallel to an axis of rotation of the rotary element, rotary element being mounted adjacent the conveying path so that rotation of the rotary element causes said at least one projection to sweep round and pass adjacent the conveying path in the conveying direction.

4. An apparatus according to claim 2, wherein the rotary element has an axis of rotation extending generally transverse to the conveying path, with said at least one projection extending radially.

5. An apparatus according to claim 1, wherein the aligning device comprises an endless belt causing said at least one projection to travel, a run of the belt extending adjacent the conveying path.

6. An apparatus according to claim 1, wherein the conveyor is a vibratory bowl conveyor.

7. An apparatus according to claim 3, wherein the conveyor is a vibratory bowl conveyor.

8. An apparatus according to claim 1, further comprising a barrier at one side of the conveying path so that misaligned articles project to the other side, the aligning device being provided at said other side.

9. An apparatus according to claim 3, further comprising a barrier at one side of the conveying path so that misaligned articles project to the other side, the aligning device being provided at said other side.

10. An apparatus according to claim 1, further comprising a plurality of said aligning devices spaced along the conveying path.

11. An apparatus according to claim 1, wherein the conveyor has a corresponding conveyor speed at which articles are conveyed, the aligning device causing said at least one projection to travel parallel to the conveying direction at a speed greater than the conveyor speed.

12. Apparatus comprising:
   a conveyor conveying articles in a conveying direction along a predetermined conveying path, the conveyed articles having a desired direction of alignment relative to the conveying direction and being conveyed so that a misaligned article tends to project laterally from the conveying path; and
   a projection traveling cyclically adjacent to the conveying path so as to contact a conveyed, misaligned article and thereby rotate the conveyed, misaligned article to reduce misalignment.

13. An apparatus according to claim 12, further comprising:
   a rotary element from which the projection projects, the rotary element rotating to cause the projection to travel cyclically, the rotary element being positioned so that the projection travels adjacent to the conveying path.

14. An apparatus according to claim 13, wherein the rotary element is disk shaped and mounted adjacent the conveying path so that rotation of the rotary element causes the projection to sweep round and pass adjacent the conveying path in the conveying direction.

15. An apparatus according to claim 13, wherein the rotary element has an axis of rotation extending generally transverse to the conveying path, with the projection extending radially from the rotary element.

16. An apparatus according to claim 12, further comprising:
   a belt causing the projection to travel, a run of the belt extending adjacent the conveying path.

17. An apparatus according to claim 12, wherein the conveyor is a vibratory bowl conveyor.

18. An apparatus according to claim 12, further comprising:
   a barrier at one side of the conveying path so that misaligned articles project to the other side of the conveying path, the projection traveling adjacent to said other side.

19. An apparatus according to claim 12, wherein the conveyor has a corresponding conveyor speed at which articles are conveyed, the projection traveling parallel to the conveying direction at a speed greater than the conveyor speed.

20. Apparatus comprising:
   a conveyor conveying articles in a conveying direction along a predetermined conveying path, the conveyed articles having a desired direction of alignment relative to the conveying direction and being conveyed so that a misaligned article tends to project laterally from the conveying path; and
   a rotary element having a projection projecting therefrom, the rotary element rotating and being positioned so that the projection travels cyclically adjacent to the conveying path so as to contact a conveyed, misaligned article and thereby rotate the conveyed, misaligned article to reduce misalignment.

21. Apparatus comprising:
   means for conveying articles in a conveying direction along a predetermined conveying path, the conveyed articles having a desired direction of alignment relative to the conveying direction and being conveyed so that a misaligned article tends to project laterally from the conveying path; and
   means for causing an element to travel cyclically adjacent to the conveying path so as to contact a conveyed, misaligned article and thereby rotate the conveyed, misaligned article to reduce misalignment.

22. A method comprising:
   conveying articles in a conveying direction along a predetermined conveying path, the conveyed articles having a desired direction of alignment relative to the conveying direction and being conveyed so that a misaligned article tends to project laterally from the conveying path; and
   causing an element to travel cyclically adjacent to the conveying path so as to contact a conveyed, misaligned article and thereby rotate the conveyed, misaligned article to reduce misalignment.

23. Apparatus which aligns articles conveyed in a conveying direction along a predetermined conveying path, the conveyed articles having a desired direction of alignment relative to the conveying direction and being conveyed so that a misaligned article tends to project laterally from the conveying path, the apparatus comprising:
   an element traveling cyclically adjacent to the conveying path so as to contact a conveyed, misaligned article and thereby rotate the conveyed, misaligned article to reduce misalignment.

* * * * *

UNITED STATES PATENT AND TRADEMARK OFFICE
CERTIFICATE OF CORRECTION

PATENT NO.     : 6,505,729 B2
DATED          : January 14, 2003
INVENTOR(S)    : Bernard Austin Timings It is certified that error appears in the above-identified patent and that said Letters Patent is hereby corrected as shown below:

<u>Title page,</u>
Item [30], Foreign Application Priority Data, "0019510" should read -- 0019510.7 --.

Signed and Sealed this

Tenth Day of June, 2003

JAMES E. ROGAN
*Director of the United States Patent and Trademark Office*